United States Patent
Langlet et al.

(10) Patent No.: US 7,442,351 B2
(45) Date of Patent: Oct. 28, 2008

(54) PROCESS TO PRODUCES SOLUTIONS TO BE USED AS COATING AGENTS IN PHOTO-CATALYTIC AND TRANSPARENT FILMS

(75) Inventors: Michel Langlet, Le Versoud (FR); Christophe Vautey, Lyons (FR); Alexei Kim, Memylan (FR)

(73) Assignee: Koninklijke Philips Electronics, N.V., Eindhoven (NL)

( * ) Notice: Subject to any disclaimer, the term of this patent is extended or adjusted under 35 U.S.C. 154(b) by 585 days.

(21) Appl. No.: 10/528,626

(22) PCT Filed: Sep. 15, 2003

(86) PCT No.: PCT/IB03/04141

§ 371 (c)(1),
(2), (4) Date: Mar. 22, 2005

(87) PCT Pub. No.: WO2004/028973

PCT Pub. Date: Apr. 8, 2008

(65) Prior Publication Data

US 2006/0008412 A1  Jan. 12, 2006

(30) Foreign Application Priority Data

Sep. 25, 2002 (EP) .................................. 02292351

(51) Int. Cl.
*C22B 34/10* (2006.01)
*C01G 23/047* (2006.01)
*C01G 23/053* (2006.01)

(52) U.S. Cl. .......................... 423/69; 423/274; 423/275; 423/608; 423/610

(58) Field of Classification Search ................. 423/69, 423/274, 275, 608, 610, 611, 612
See application file for complete search history.

(56) References Cited

U.S. PATENT DOCUMENTS 5,160,762 A * 11/1992 Brand et al. .................. 427/79
5,593,737 A *  1/1997 Meinzer et al. ............. 427/512

(Continued)

FOREIGN PATENT DOCUMENTS

EP    1167296 A1    1/2002

(Continued)

OTHER PUBLICATIONS

Barbé et al., Nanocrystalline Titanium Oxide Electrodes for Photovoltaic Applications, 1997, J. Am. Ceram. Soc., vol. 80, 3157-3171.*

*Primary Examiner*—Timothy C. Vanoy
*Assistant Examiner*—Serena L Hanor

(57) ABSTRACT

The invention relates to a process for producing a stable solution containing Anatase titanium oxide intended to be deposited on a substrate in order to obtain a transparent photo-catalytic coating. Such a process includes the preparation of an initial stabilized peptized solution including a titanium precursor material, an organic solvent, an acid agent, the mixing of said initial solution with a large amount of water, the pH of the obtained intermediate solution being less then 3, subjecting said intermediate solution and its dispersion to a heat-treatment, the exchange of water by an organic solvent with low surface tension to obtain a final solution that is finally dispersed. The invention particularly allows to coat thermally sensitive and/or transparent substrates with photo-catalytic films of high optical quality.

16 Claims, 3 Drawing Sheets

U.S. PATENT DOCUMENTS

| | | | | |
|---|---|---|---|---|
| 5,897,958 A | * | 4/1999 | Yamada et al. | 446/474 |
| 6,071,623 A | * | 6/2000 | Sugawara et al. | 428/428 |
| 6,376,023 B1 | * | 4/2002 | Mori | 427/430.1 |
| 6,530,946 B1 | * | 3/2003 | Noda et al. | 607/113 |
| 6,576,589 B1 | * | 6/2003 | Na et al. | 502/350 |
| 6,627,336 B1 | * | 9/2003 | Ohmori et al. | 428/702 |
| 6,770,257 B1 | * | 8/2004 | Imura et al. | 423/610 |
| 6,913,811 B2 | * | 7/2005 | Itoh et al. | 428/131 |
| 7,297,206 B2 | * | 11/2007 | Naruse et al. | 106/634 |

FOREIGN PATENT DOCUMENTS

| | | |
|---|---|---|
| KR | 2001696668 A | 11/2001 |

* cited by examiner

PROCESS TO PRODUCES SOLUTIONS TO BE USED AS COATING AGENTS IN PHOTO-CATALYTIC AND TRANSPARENT FILMS

TECHNICAL FIELD

The invention relates to a process for producing a stable solution containing Anatase titanium oxide intended to be deposited on a substrate, particularly on a thermally sensitive substrate, to produce transparent photo-catalytic coatings. The Anatase titanium oxide is well known for its high photo-catalytic activity. Coated on a material, Anatase provides self-cleaning properties to this material. In addition, this photo-catalytic coating can be used for the removal of harmful materials, the deodorization/decomposition of odor substances, antifouling, bactericide activity, sterilization . . .

The invention relates also to a solution obtained by a process for producing a stable solution according to the invention, to a process for coating a substrate using the solution obtained according to the invention, and to the coated substrate obtained by such a process.

BACKGROUND OF THE INVENTION

It is well known that photo-catalytic coatings presenting an optical quality are easily obtained by thermal crystallization of amorphous sol-gel $TiO_2$ films. Such crystallization usually requires a post-deposition thermal treatment at relatively high temperatures. This restrains photo-catalytic applications to supports of reasonably good thermal stability, such as fused silica or mineral glasses. Photo-catalytic properties of $TiO_2$ films deposited on polymers have rarely been studied in the sol-gel literature. To exploit the photo-catalytic properties of sol-gel $TiO_2$ films on thermally sensitive substrates, such as polymer supports, low temperature crystallization approaches are necessary.

Patent application EP 1 167 296 proposes such an approach. In this document, three inventions having different aims and effects are presented. The two first inventions propose to obtain Anatase titanium oxide by a heat treatment in a closed vessel. These two first inventions are mainly intended to obtain a crystallized powder. A coating is nevertheless realized with the obtained slurry to prove the photo-catalytic activity, but these coatings are thick and don't allow the optical properties of the coated substrate to be preserved. Such inventions are more intended for ceramic applications, the crystalline powder being recovered by centrifugation after thermal treatment of the solution. No data in these two first inventions mentioned the sol-gel preparation of stable suspensions compatible with the deposition of optical quality photo-catalytic $TiO_2$ films.

The third invention proposes to perform an ozone treatment to obtain a coatable solution. This coatable solution allows obtaining optical quality coatings. Nevertheless the photo-catalytic activity appears to be quite weak. The addition of some slurry obtained according to one of the first two inventions is proposed to enhance it. Moreover it has to be underlined that ozone has to be fabricated on-site which is constraining, as it is an irritant oxidant that causes problems in the security of the industrial process.

SUMMARY OF THE INVENTION

The invention proposes to deposit photo-catalytic films at low temperature. It relies on the possibility to prepare liquid suspensions of crystallized $TiO_2$ particles, which can then be deposited using traditional liquid phase deposition techniques, such as spin-, dip- or spray-coating. It is an object of the present invention to propose a process to obtain a solution that can be directly deposited on a substrate without requiring heating of the coating to obtain a photo-catalytic effect or requiring only a heat treatment at low temperature. The invention does not use ozone or any other material that is not well adapted to industrial conditions. Moreover, the invention proposes a short process that allows flexible experimental conditions. The invention then allows coating a heat-sensitive material with a photo-catalytic film while preserving the optical and mechanical qualities of said material.

According to the invention, a process to prepare a solution intended to be deposited on a substrate in order to obtain a transparent photo-catalytic coating, comprises the steps of preparing an initial stabilized peptized solution including a titanium precursor material, an organic solvent, an acid agent, mixing said initial solution with water in such a manner that the molar ratio of water-to-titanium of the obtained intermediate solution is greater than 0.8, the quantity of acid agent in said initial solution being such that the pH of said intermediate solution is less than 3, subjecting said intermediate solution to a heat treatment at a temperature between 80° C. and 270° C., dispersion of the heat-treated intermediate solution, exchange of water by an organic solvent with low surface tension to obtain a final solution, dispersion of said final solution.

Consequently, the invention proposes the sol-gel preparation of $TiO_2$ suspensions by reactions of hydrolysis and polycondensation of the titanium species. The control of the pH, water-to-titanium molar ratio (designated as $r_w$ ratio in the following) and dilution degree of the titanium presursor material in said initial, intermediate, and final solutions, is essential to the invention. These $TiO_2$ suspensions containing Anatase titanium oxide are intended to be deposited on a substrate in order to obtain a transparent photo-catalytic coating.

In advantageous embodiments of the invention, said initial peptized solution is notably stabilized by the presence of water in order to have a molar ratio of water-to-titanium smaller than 1 in said initial solution and/or by aging of said initial solution at room temperature. These means of stabilization of the initial solution do not involve heating of the initial solution, said heating could effectively initiate precipitation or gelation reactions.

In a preferred embodiment, the quantity of acid agent in said initial solution is such that the pH of said intermediate solution is between 1 and 2. In such conditions, the balance between the various reactions taking place in the solution is optimal for the aims of the invention.

In preferred implementations of the heat treatment step, this step is realized by a reflux or autoclaving treatment in a closed vessel. Advantageously, the heat-treatment is carried out at a temperature lower than 140° C. Such a characteristic of a process according to the invention allows having an optimal mechanical quality of a coating realized with the finally obtained solution on a substrate. Moreover the molar ratio of water-to-titanium of the intermediate solution obtained is advantageously greater than 30 to obtain optimal photo-catalytic properties for a coating realized with the finally obtained solution on a substrate. It is advantageous that at least one of said dispersion steps is realized by ultra-sonication of the solution. Ultrasonic frequencies are particularly efficient for breaking links between agglomerated Ti species. In order to increase the photo-catalytic activity of a coating obtained by deposition of a solution according to the above presented process, a re-concentration step is realized after the exchange step in order to obtain a more concentrated final solution.

Then the invention relates also to a process for coating a substrate with a photo-catalytic and transparent layer using a dispersed final solution as obtained by the above described process for producing a stable solution containing Anatase titanium oxide. According to such a process, thin films are then deposited at room temperature from said final solution. When coated on a substrate, the coating obtained presents an effective photo-catalytic effect without having to be heat-treated. Moreover the coating is transparent and presents good mechanical properties. The step of coating can be repeated in order to obtain a thicker layer of photo-catalytic material on the substrate, such a thick layer having stronger photo-catalytic properties.

The invention also relates to a coated substrate obtained according to the process for coating a substrate according to the invention. This substrate can be composed of any kind of thermally sensitive material, and particularly polymer materials.

Consequently, the invention finds its major application in the coating of substrates having a low heat resistance. As such coatings are transparent and as they allow the optical properties to be preserved of the substrate on which the coating is realized, the invention is also particularly interesting for transparent substrates. Transparent and thermally sensitive materials benefit most from the invention.

BRIEF DESCRIPTION OF THE DRAWINGS

The invention will be described in detail with reference to the diagrammatic Figures wherein.

DESCRIPTION OF EMBODIMENTS

The invention relates to a process for producing a stable solution containing Anatase titanium oxide intended to be deposited on a substrate in order to obtain a transparent photo-catalytic coating. Such a process includes the preparation of an initial stabilized peptized solution including a titanium precursor material, an organic solvent, an acid agent, mixing said initial solution with a large amount of water, the pH of the obtained intermediate solution being less then 3, subjecting said intermediate solution and its dispersion to a heat treatment, the exchange of water by an organic solvent with low surface tension to obtain a final solution that is finally dispersed. The invention particularly allows photo-catalytic coating of thermally sensitive and/or transparent substrates.

Figure 1:
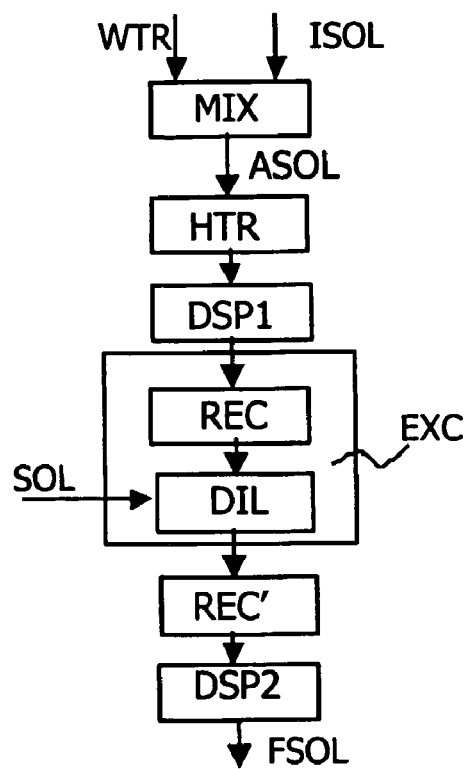
FIG. 1 shows a diagram explaining the different steps of a process for producing a solution containing Anatase titanium oxide according to the invention.

Referring to FIG. 1, the solutions are prepared from an initial solution ISOL including a titanium precursor material, absolute ethanol and an acid agent. Peptization effects stabilize the initial solution as these peptization effects stabilize the presursor material in acidic conditions. Peptization effects are induced by acidic conditions, i.e. an electrostatic repulsion mechanism between protonated hydrolyzed species, that counteracts the natural attractive van der Waals forces between particles and inhibits the poly-condensation reaction. Indeed, non-stabilized Ti species are able to hydrolyse, poly-condense and rapidly undergo precipitation or gelation, once they are put in the presence of a large amount of water. This goes against the production of a solution that can be coated to obtain a transparent layer. To achieve efficient peptization which prevents a fast poly-condensation, aging of the initial solution at room temperature is proposed according to the invention to protonate the titanium species. This aging process takes for example 60 hours. Such a duration allows preventing gelation or precipitation that would occur rapidly after mixing with a large amount of water if peptization were not achieved accurately.

In an advantageous implementation of the step of preparing the initial solution, said initial peptized solution is notably stabilized by the presence of water in order to have a molar ratio of water-to-titanium smaller than 1 in said initial solution. According to this implementation the initial solution includes a small amount of water; this small amount of water allows for good achievement of the peptization. Actually, when the initial solution does not contain water, gelation or precipitation can occur after subsequent mixing with a large amount of water, even after subsequent aging of the solution. Conversely, when a small quantity of water is preliminarily diluted in the initial solution, preferably with a water-to-titanium molar ratio of 0.8, no precipitation is observed after suitable aging and subsequent addition of a large amount of water.

Advantageously, the titanium precursor is tetraisopropyl orthotitanate (TIPT), but the presursor material including titanium can be, non-exhaustively, any of the following metal organic compounds and inorganic compounds: metal alkoxides (titanium tetramethoxide, titanium tetraethoxide, titanium tetrabutoxide . . . ), titanium oxalate, titanium nitrate and titanium tetrachloride.

Advantageously, the acid agent is hydrochloric acid added to the initial solution. Nevertheless, any acid agent including for example sulfuric acid, nitric acid, metatitanic acid . . . can be used in a process for producing a solution according to the invention.

A mixing step MIX with de-ionized water WTR allows obtaining an intermediate acid aqueous solution ASOL. The quantity of acid agent in the initial solution ISOL is such that the pH in the intermediate acid solution ASOL is lower than 3, and preferably ranges between 1 and 2. Those acidic conditions catalyze the hydrolysis reaction through nucleophilic attack mechanisms. They also delay the poly-condensation reaction through peptization effects. Both effects are required to form crystalline $TiO_2$ particles. Indeed, during the sol-gel transformation of titanium alkoxides, hydrolysis and poly-condensation usually take place simultaneously, leading to incompletely hydrolyzed $TiO_x(OH)_y(OR)_z$ species in the ASOL solution (where OR represents non-hydrolyzed groups). Non-hydrolyzed alkoxy groups act as structural defects. These defects inhibit subsequent crystallization during the heat-treatment step HTR, which results in amorphous oxide particles. It is known that amorphous $TiO_2$ particles do not exhibit any photo-catalytic activity. To achieve crystallization, it is therefore important that hydrolysis goes to completion before poly-condensation proceeds significantly. In other words, balanced hydrolysis/poly-condensation reaction kinetics are needed. This requirement necessitates that the sol-gel transformation be achieved with a sufficient amount of water, in order to activate the hydrolysis reaction, and in suitable acidic pH conditions, which catalyze the hydrolysis reaction and delay the poly-condensation reaction. In such conditions, alkoxy free $TiO_x(OH)_y$ hydroxyl species are effectively formed in the ASOL solution.

These mechanisms are strongly influenced by the peptization conditions. Less poly-condensed and thus less acidic hydroxyl species are preferably protonated in acidic conditions. Consequently, suitable acidic conditions favor the stabilization of short cross-linked Ti—O—Ti chains. Conversely, due to the strong sol-gel reactivity of titanium alkoxides in nearly neutral pH conditions, it is observed that dense three-dimensional particles are obtained as soon as the pH exceeds a value of 3. Ti—O—Ti chains are particularly obtained at a pH lower than 2. Consequently according to a preferred embodiment of the invention, balanced hydrolysis and peptization effects are preferably obtained for a pH between 1 and 2. In conditions where pH is lower than 3, due to efficient peptization, the ASOL solution remains perfectly transparent for an $r_w$ ratio of 90 or more. Only a small increase in viscosity is measured due to a limited sol-gel reaction, giving rise to short and alkoxy free $TiO_x(OH)_y$ chains.

The acidic solutions are then heat treated in a heat-treatment step HTR, for example, by refluxing or autoclaving, for several hours or days, in the [80° C.-270° C.] thermal range. This yields $TiO_2$ crystallites. Effectively, during refluxing or autoclaving, alkoxy free $TiO_x(OH)_y$ hydroxyl species polycondense and cross-link to form pure oxide clusters. Those clusters act as nucleation sites for the subsequent growth of nano-crystals. Indeed, the short $TiO_x(OH)_y$ species induced by mixing with water in acidic peptization conditions favor the nucleation of homo-dispersed, small crystallites rather than the growth of larger particles. The autoclaving and reflux procedures are carried out under natural vapor pressure or natural atmosphere, without the use of additional agent like ozone.

In a first preferred implementation of the heat-treatment step, the heat-treatment is performed by refluxing. Solutions appear to sediment rapidly after a 6 hr reflux and they can only be re-dispersed after a long dispersion step by strong dispersion means such as, for example, ultrasonic agitation.

In a second preferred implementation of the heat treatment step, the heat treatment is carried out by autoclaving. For autoclaving, the solution ASOL is for example heat-treated in a stainless steel closed vessel, which is placed in a tubular furnace and thermally regulated. After autoclaving for 6 hours, a thick paste is produced, which can be easily dispersed in a dispersion step DSP1 by ultrasonic agitation or any other stirring means. Dispersion can also be initiated during heat treatment, so that the dispersion step DSP1 can be noticeably shortened. After dispersion, a stable solution containing a large number of small particles in suspension is produced, which undergoes no or very slow sedimentation. Due to good stabilization features, this solution can be prepared with high TIPT concentrations and it is then flexibly processed in a wide range of experimental conditions. It has to be noted that small pH variations, associated with the dilution of the initial solution in water, do not affect the peptization effects and, subsequently the solution behaviors.

In the presence of a large stoichiometric excess of water, crystallization of sol-gel $TiO_2$ particles is governed by kinetics rather than thermodynamics, and autoclaving conditions do not influence noticeably the size and crystallization degree of sol-gel derived Anatase particles, provided that the thermal treatment is performed with a sufficient amount of water and suitable acid pH.

Nevertheless, autoclaving experiments show that de-agglomeration proceeds more efficiently during autoclaving at a higher temperature and a greater $r_w$ ratio or a lower pH. These features are related to more efficient hydrolysis and peptization conditions. In acidic conditions, crystallization induced by balanced hydrolysis/peptization conditions competes with the formation of a $TiO_2$ amorphous network composed of incompletely hydrolyzed Ti—O—Ti chains. These chains tend to link more strongly the crystallites and require more energy or longer de-agglomeration treatment to be decomposed. At a lower $r_w$ ratio or a higher pH, the competitive mechanism is biased toward chain formation, which promotes stronger crystallite bonding. Conversely, hydrolysis and peptization are thermally activated and favored by a greater $r_w$ ratio and a lower pH, which biases the sol-gel reaction toward the formation of easily dispersible crystallites. A longer heat treatment of the solution allows also a better de-agglomeration. A fast sol-gel reaction occurs during the first stages of the thermal treatment, which promotes granular agglomeration. As the treatment continues, de-agglomeration partially takes place under the effect of liquid agitation induced by heat treatment. De-agglomeration is probably also promoted by thermally activated peptization effects. Compared to refluxing, autoclaving promotes a more efficient de-agglomeration due to combined convection and pressure effects, which yields more stable solutions that are not observed to sediment rapidly and are easily stabilized by ultrasonication or any other stirring method. Dispersion effects of the heat treatment can then participate in achieving this stabilization.

Water is a high surface tension liquid that does not lend itself to the deposition of homogeneous films, due to de-wetting effects. For this reason, after thermal treatment of the solution, an exchange step EXC with a low surface tension solvent SOL is performed in order to remove water WTR initially present in the solution. The exchange step EXC consists classically in a thermal re-concentration sub-step REC during which the first solvent (water here) is evaporated and a dilution sub-step DIL during which the re-concentrated solution is diluted in the second solvent SOL (here for example ethanol). The exchange step EXC can be carried out with any low surface tension liquid, particularly with alcohols. When ethanol is, for example, used as the dilution solvent SOL, the solution can optionally be further re-concentrated in a re-concentration sub-step REC', represented in dotted lines in FIG. 1, in order to complete residual-water elimination through evaporation of the water-ethanol azeotrope.

After the exchange procedure EXC, particles formed in the solution may tend to sediment, which requires a new dispersion step DSP2. Those particles again consist of agglomerated nano-crystallites partially linked by some remnant Ti—O—Ti chains. These chains can be broken by ultrasonication or any other dispersion method. A more or less long final dispersion step DSP2, regarding the autoclaving temperature and duration, the pH and the $r_w$ ratio, is necessary to produce efficient grain dispersion and to promote a good film optical quality. Then, the $TiO_2$ particles are efficiently dispersed, and films of high optical quality can be deposited. As an example, short ultrasonication of about one hour is sufficient for solutions prepared with a pH lower than 1.5 and a $r_w$ ratio of 30 or more, autoclaved at 200° C. for 6 hr, exchanged with ethanol.

After de-agglomeration, the protonated $TiO_2$ nano-crystallites are stabilized in the solution through electrostatic repulsion effects. Such conditions favor the absence of sedimentation and the reproducible deposition of high optical quality films is possible over a period of several months using a same solution. The final solution is advantageously stirred before deposition.

According to a coating process of the invention, the obtained final solution FSOL is then deposited in thin films at room temperature by spin-coating, which means that a given volume of the solution is radially spread on a rotated substrate. The coating operation can be carried out using any of the known sol-gel deposition methods. For example, dip-coating, spin-coating, spray-coating . . .

For spin-coating deposition, the liquid volume and rotating speed are for example adjusted at 2 to 20 µl and 2500 to 6000 rpm, respectively, depending on the size or nature of the substrate and on the solution viscosity. After deposition, the dilution solvent rapidly vaporizes, leading to a crystalline $TiO_2$ film. Deposition can be performed on silicon wafers for routine characterizations.

According to a preferred embodiment of the invention, the deposition takes place on polycarbonate (PC) or polymethylmethacrylare (PMMA) substrates. This allows checking the optical properties of the coating by UV/visible transmission measurements as well as the compatibility of the coated film with thermally sensitive substrates. It is also interesting to have the photo-catalytic characterizations of these kinds of substrate that are more relevant to the invention. Films with various thicknesses are deposited using a multi-layer deposition procedure. In such a procedure, each single-layer is for example allowed to dry at room temperature for 30 sec or heat-treated in air at about 100° C. for 10 sec before deposition of the next layer. Optionally an additional step may be carried out in which the layer is subjected to a heat treatment at a temperature lower than 140° C. to increase the mechanical quality of the film. By increasing the thickness of the layer, it is possible to increase the photo-catalytic activity of this layer.

According to the process of producing a solution of the invention, sedimentation effects can be precluded by using small and homo-dispersed crystallites. Consequently, acidic solutions could be processed in a wide range of experimental conditions compatible with the deposition of high optical quality photo-catalytic films. Comparable photo-catalytic activities are obtained for the coatings realized from the different solutions obtained according to the invention. Small variations observed concerning film porosity, crystallite size, and micro-grain amount do not influence noticeably the photo-catalytic properties, which are essentially controlled by the similar crystallization degrees of the films. Finally, examples described hereinafter show that films with reasonably good mechanical resistance are obtained.

EXAMPLES

Some examples are given hereinafter with the characterizations of their properties. The microstructural, morphological, optical, and photo-catalytic properties of the films are studied with respect to the solution's processing parameters. The films have been characterized immediately after deposition or after subsequent heat-treatment in air for 2 hr at temperatures up to 140° C.

For these characterizations, TEM investigations are carried out on small fragments, obtained by scraping thin film samples, and deposited on copper grids coated with a carbon film. A JEOL-200CX microscope is used in a configuration allowing large tilt angles of the specimen (±45°) and a lattice fringe resolution of 3.2 Å. A Philips XL 30 scanning electron microscope is used to study the film surface morphology. The film surface quality is also analyzed from optical microscope (Leica DMLM) dark field images. Transmission FTIR spectra are recorded in the [4000-250 cm−1] spectral range with a resolution of 4 cm−1 using a Bio-Rad FTS-165 spectrometer. Spectra are recorded in room atmosphere without any purging and consisted of 300 scans. The spectra are analyzed after subtraction of the bare substrate spectrum from the sample spectrum (film onto Si wafer) in order to eliminate the Si contribution. The thickness and refractive index of films deposited on silicon are measured using a Gaertner L116B ellipsometer at 632 nm wavelength. Visible transmittance spectra of films deposited on PC are measured in the [200-1100 nm] range using a Jasco V-530 spectrophotometer. The mechanical quality of the films is comparatively tested with the Taber test using various loads.

For photo-catalytic activity measurements, films on Si or PC are immersed in a malic (butanol dioic) acid aqueous solution and exposed for different times at room temperature to UV-irradiation provided by a Philips HPK 125 UV-lamp using a Corning 0.52 filter (λ>340 nm). A small volume of the solution is periodically withdrawn to measure the concentration of malic acid as a function of time. Malic acid analysis is done by liquid chromatography (HPLC) using a "Waters 600" chromatograph, equipped with a SARASEP CAR-H column (eluent: H2SO4, 5 10-2 M; flow rate: 0.7 ml/min; detection at λ=210 nm). The photo-catalytic activity is identified as the rate of disappearance of malic acid. Malic acid is chosen as a model molecule of carboxylic acids, which are the best representatives for the main constituents of intermediate products in oxidative degradation processes.

According to the presented examples, TIPT is first diluted in ethanol ($C_{TPT}$=0.4 M) and peptized in acidic conditions (pH=1.27) using hydrochloric acid. For example, to obtain such a concentration and pH, a solution containing 59.5 ml of TPT and 190.5 ml of absolute ethanol is mixed under agitation with a solution containing 246.5 ml of absolute ethanol, 2.3 ml of HCl 36% and 1.2 ml of $H_2O$. A volume of 500 ml is obtained. To have optimal stabilization effects, a small amount of water is present in the initial solution MSOL and the presented example allows preparing 500 ml of a solution with $C_{TPT}$=0.4 M, pH=1.27 and a water to TIPT molar ratio $r_w$=0.8. In the presented examples, the initial solution is aged for around 60 hours at room temperature before being mixed with water.

This initial solution (for example, 150 ml) is then added, for example dropwise, at room temperature to a given volume of water (for example 31.5 ml to obtain a $r_w$ ratio of 30 and a $C_{TPT}$=0.33 mol/l) under magnetic stirring. Experimentally, the mixing step in water is performed in order to vary the final $r_w$ ratio from 0.8 (with no additional water) to 90. All the resulting solutions remained transparent after mixing. The partial re-dilution in water caused slight increases (or decreases) in the solution's pH (or TIPT concentration). The final compositions of the different solutions tested in this study are summarized in the table below:

| Solution | $r_w$ | pH | $C_{TPT}$ |
|---|---|---|---|
| B1 | 0.8 | 1.27 | 0.4 M |
| B2 | 15 | 1.31 | 0.36 M |
| B3 | 30 | From 1.35 to 2.00 | 0.33 M |
| B4 | 90 | 1.48 | 0.24 M |
| B5 | 90 | 1.48 | 0.24 => 0.48 M |

These solutions with various $r_w$ ratios are then refluxed at 100° C. or autoclaved at temperatures ranging from 100 to 200° C. for 6 hours. In the numeric example cited, about 180 ml of a paste is obtained after heat treatment. After autoclaving, this paste could be easily re-dispersed by ultrasonication or magnetic stirring for a few tens of minutes, while dispersing was more difficult after refluxing. Examples concerning autoclaved solutions are provided hereafter. After heat-treatment, the solutions are exchanged with ethanol. This step consists in first thermally re-concentrating the solution 10 times, resulting in 18 ml of a concentrated solution. Then the solution is diluted 10 times in ethanol. In the numeric example, 162 ml of ethanol is added to 18 ml of the concentrated solution, resulting in 180 ml of a diluted solution presenting a titanium concentration of 0.33 mol/l in ethanol. After exchange, the ethanolic solution is again ultrasonicated for 1 hour. The solution with $r_w$ ratio of 0.8 appeared to be transparent and stable over time. All the other solutions became milky after autoclaving, exchange, and subsequent ultrasonication. Solutions with an $r_w$ ratio of 30 autoclaved at 200° C. appeared to be remarkably stable as no sedimentation was observed over a period of several months. The other solutions sedimented very slowly. In any case, a short magnetic stirring operation performed before deposition allowed films of good optical appearance to be reproducibly deposited over a solution aging period of several months. The viscosity of the solutions is observed to decrease with magnetic or ultrasonic stirring and aged viscous solutions recover their initial viscosity after stirring for a few minutes. Nanocrystallites are produced in the whole range of experimental conditions tested here, provided that the solution was prepared with a sufficient amount of water.

Figure 4:
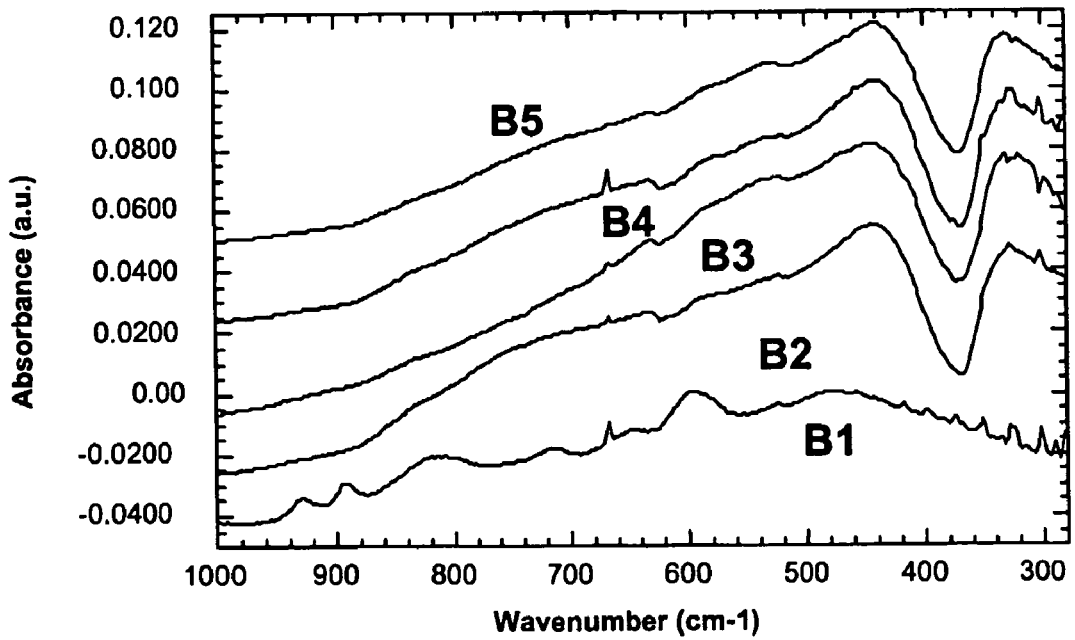
FIG. 4 shows FTIR spectra of films deposited from solutions obtained by a process for producing a solution according to the invention.

FIG. 4 shows the FTIR spectra of films deposited from solutions prepared with various $r_w$ ratio and autoclaved at 100 or 200° C. for 6 hours. For a solution B1 ($r_w$ ratio of 0.8 and autoclaving at 100° C.), the spectrum exhibits a broad band centered around 470 cm$^{-1}$, with several additional narrow bands located between 1000 and 500 cm$^{-1}$. This is the typical spectrum of a $TiO_2$ oxopolymer, i.e. an amorphous $TiO_2$ network with chain-end alkoxy or hydroxyl groups, which indicates that, for a low $r_w$ ratio value, autoclaving does not yield crystallization. For an $r_w$ ratio of 15 or more, intense and well-resolved bands around 440 and 330 cm$^{-1}$ indicate good and similar crystallization degrees. These crystallizations appear irrespective of the autoclaving temperature. Traces of water, but no alkoxy groups, could be detected by FTIR.

The SAED pattern, dark and bright field TEM images and a high resolution TEM image, for a film deposited from solution B3 prepared with an $r_w$ ratio of 30 and a pH of 1.35 and autoclaved at 200° C., confirm that well crystallized Anatase particles have been formed. Anatase crystallites appear to be 10 nm or less in size and exhibit isotropic shapes. Besides a good crystallization degree, that determines the photo-induced charge carriers generation in $TiO_2$ grains, a small crystallite size is another factor that advantageously influences the photo-catalytic activity of the film by promoting a greater specific surface and thus a greater contact surface with matter to be photo-catalytically decomposed.

Figure 5A:
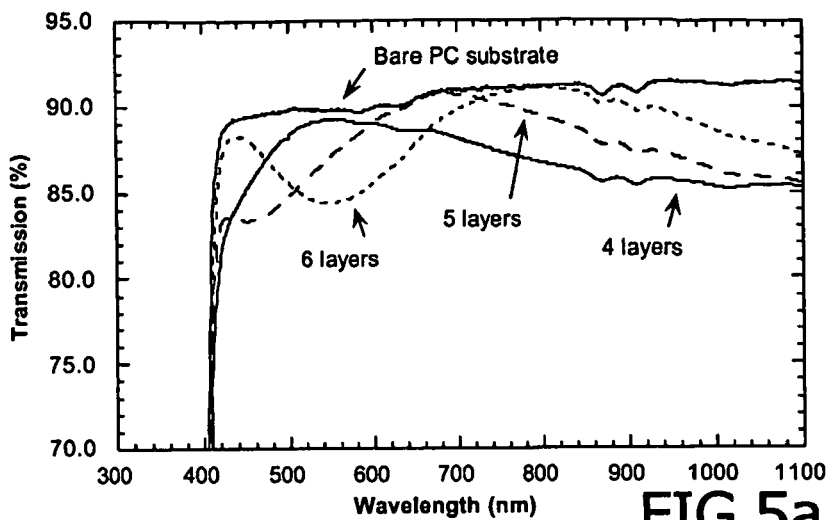
FIGS. 5a, 5b, 5c show the UV/visible transmission spectra for multilayer films of various thickness deposited from three solutions obtained by a process for producing a solution according to the invention.
Figure 5B:
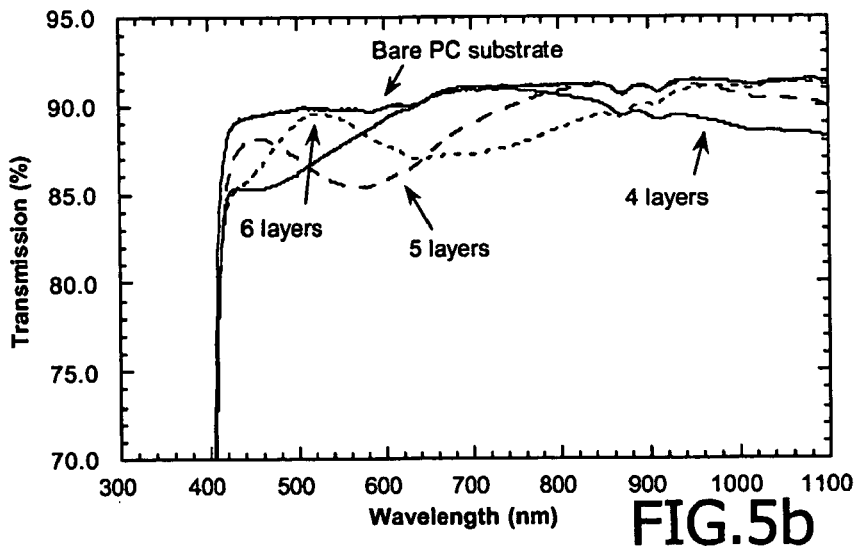
Figure 5C:
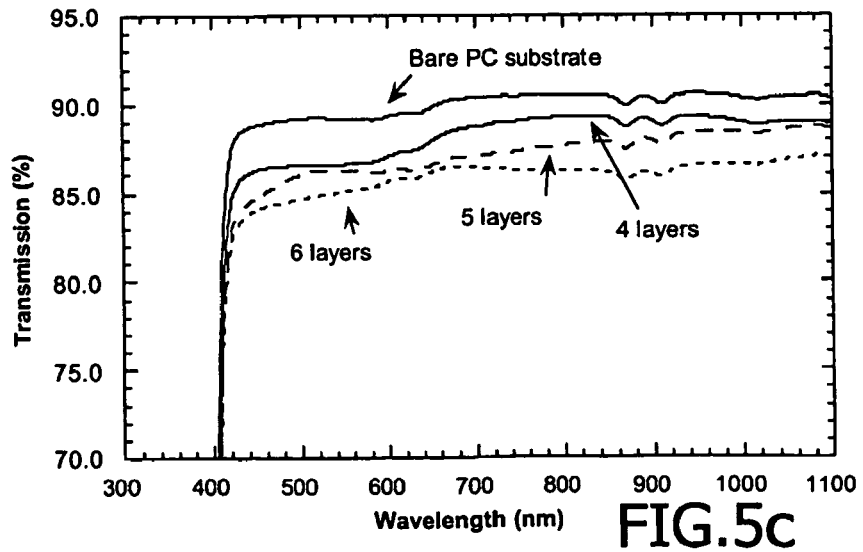

FIGS. 5a, 5b, 5c show UV/visible transmission spectra for films deposited from various solutions. Optical microscope dark field images have also been obtained but are not presented in the Figures. As seen hereinbefore, the solutions are prepared with various $r_w$ ratios, autoclaved at 200° C., exchanged with ethanol, and subsequently ultrasonicated for 1 hr. In FIG. 5a, at an $r_w$ ratio of 90 (solution B4), the film exhibits an excellent optical quality. In the [500-1100 nm] spectral range, the transmission maxima closely fit the transmission spectrum of the bare substrate, indicating negligible absorption and scattering optical losses. Below 500 nm, the transmission losses are about 1%. A lower optical quality is observed when the final ultrasonication is performed for less than 1 hr. After 1 hr ultrasonication, some micrograins can be observed in the optical micrograph, but they appear to be very small in amount and to have negligible influence on scattering or absorption optical losses. Apart from the very small amount of micrograins, SEM observations show that the substrate was homogeneously coated with grains of about 100 nm in size, which consisted of small aggregates of nanocrystallites. Once again, it is important to note that the film optical quality could be reproduced using the same solution over a period of several months. A similar optical quality is also obtained when a solution with an $r_w$ ratio of 90 is additionally re-concentrated twice (solution B5). In this case, the final $C_{TPT}$ is 0.48 M instead of 0.24 M. Such a concentrated solution allows depositing thicker films, while simplifying the multi-layer deposition procedure.

It is observed that the micro-grain amount increases with decreasing $r_w$ ratio. In FIG. 5b, at an $r_w$ ratio of 30 (solution B3 with pH of 1.35), this trend appears to be limited and the film optical quality remains comparable to that obtained at an $r_w$=90 (solution B4). In FIG. 5c, at an $r_w$=15 (solution B2), the film exhibits more numerous and larger grains, which yield a weaker optical quality. It can be noted that an optical quality alteration is also observed in the case of a shorter time or lower temperature autoclaving or for solutions prepared with a higher pH. However, in any case studied here, the film can reach an optical quality similar to that obtained for solutions B3 and B4, provided that the final ultrasonication is performed for sufficient time. It is noted that at an $r_w$ ratio of 0.8, the optical quality appears to be very good, but in that case, no crystallization occurs.

It is possible to observe cracks in multilayer thick films deposited from solution B4 with an $r_w$ ratio of 90. At this $r_w$ ratio value, water is not completely removed from the solution during the exchange step. As evaporation proceeds more slowly for water than for ethanol, it is likely that during the multi-layer deposition procedure water continues to evaporate from the first deposited layers after deposition of the subsequent layers, which produces cracks once the multi-layer film exceeds a given thickness. This assumption was confirmed by the fact that the solution underwent a slow liquid phase separation over time, which suggests separation between water rich and water poor phases. On the other hand, no liquid phase separation is observed for a solution which is prepared with an $r_w$ ratio of 30, a pH of 1.35 and which is subsequently autoclaved at 200° C. Corresponding films do not suffer cracks. Cracks can also be observed in multi-layer films deposited from solutions heat-treated at lower temperatures or prepared with a higher pH or a lower $r_w$ ratio. Such conditions promote less efficient hydrolysis and thus, more water remains in the solution. This problem is easily solved by a short heat treatment after the deposition of each single-layer, which allows water to be vaporized before deposition of the subsequent layer. For example, a heat-treatment at 110° C. is carried out for 10 seconds after each single-layer deposition, which yields uncracked multilayer coatings of 500 nm or more in thickness.

Figure 2:
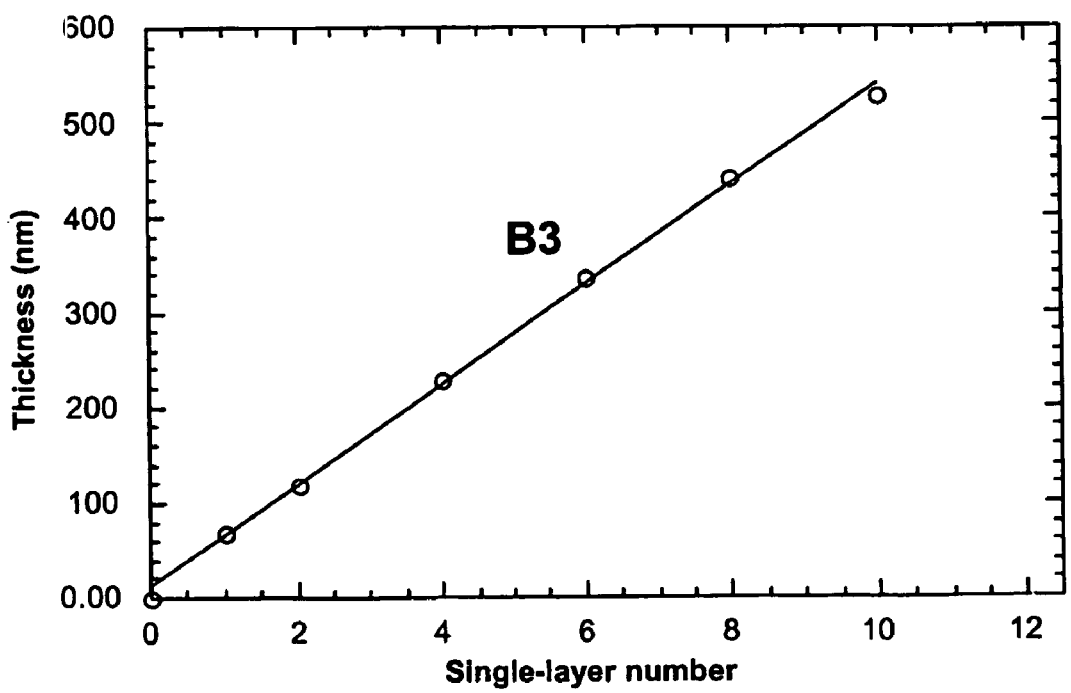
FIG. 2 shows a diagram of the thickness of a multi-layer film deposited according to the invention versus the single-layer number.

To summarize, solutions peptized in acidic conditions and subsequently autoclaved at 100-200° C. present a good stability, and yield films of good optical quality and crystallization degree for a large range of experimental conditions. It may nevertheless be necessary to provide for a suitably long ultrasonication duration after the solution has been prepared, and/or a short heat-treatment at low temperature during the multi-layer procedure. In FIG. 2, the thickness of multi-layer films is measured in the case of solution B3 prepared with an $r_w$ ratio of 30 and a pH of 1.35 and autoclaved at 200° C.

Ellipsometric measurements show that the film thickness could be reproducibly controlled using a multi-layer deposition procedure. The film porosity is deduced from ellipsometric measurements of the refractive index, using the Lorentz-Lorentz relationship. The refractive index at 632 nm is measured to be 1.70+/−0.05 and 1.85+/−0.05, which yields a volume porosity of around 40% and 30% for solutions autoclaved at 200° C. having an $r_w$ ratio of 30 and 90, respectively. Refractive index values of 1.95+/−0.05 (porosity of 25 vol %) and 2.00+/−0.05 (porosity of 20 vol %) are measured for solutions autoclaved at 130° C. having an $r_w$ ratio of 30 and 90, respectively. These data indicate that solutions crystallized using a greater amount of water or a lower heat-treatment temperature yield denser films. Accordingly, denser films exhibit greater scratch resistance and good adhesion properties. The scratch resistance of such films is comparable to or better than the scratch resistance of polymer substrates, for which the films deposited according to the invention are particularly intended. It has to be noted that even better scratch resistances are reached when the $TiO_2$ crystallites are embedded in a $SiO_2$ matrix. For that purpose, the $TiO_2$ solution prepared according to the invention is mixed with a $SiO_2$ solution prepared according to the sol-gel state of the art. The mixed solution thus formed is then deposited, yielding a composite $TiO_2$—$SiO_2$ mixed film. In order to improve its mechanical resistance, the composite film can then be optionally heat-treated at a temperature around 110° C., which is compatible with the thermal stability of polymer materials. Any other known low temperature hardening treatment, for instance hardening under ammoniac vapors, can also be used.

Figure 3:
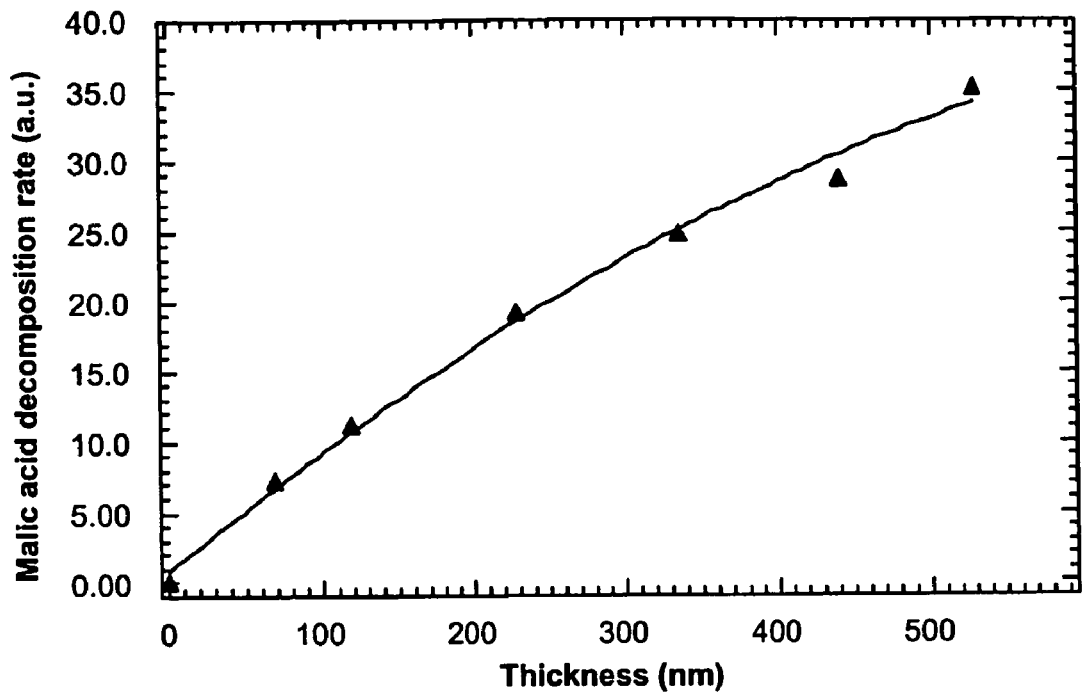
FIG. 3 illustrates the photo-catalytic decomposition rate of malic acid versus film thickness.

FIG. 3 illustrates the photo-catalytic activity of a solution prepared with an $r_w$ ratio of 30, a pH of 1.35 and autoclaved at 200° C. Here, the photodecomposition rate of malic acid appeared to be of zero kinetic order. FIG. 3 shows that the photo-catalytic activity increases continuously with the film thickness, i.e. the number of single-layers. Similar photo-catalytic activities were measured on crystalline films of comparable thickness deposited from solutions peptized in the various conditions, proposed in the table above, and autoclaved in the [100-200° C.] thermal range. Besides a good crystallization degree and small crystallite size, the film porosity is another factor that can influence the photoactivity of the films. On the one hand, liquid or gaseous reactants to be destroyed, which are adsorbed at the film surface, are able to diffuse through the pores, inducing a greater quantity of $TiO_2$ particles involved in the photo-catalytic reaction. On the other hand, the porosity could also be a limiting factor. $TiO_2$ particles that are not directly in contact with reactants might be able to participate in the photo-catalytic process, provided that an efficient transfer of charge carriers occurs between particles. Too high a porosity could reduce the intergranular transfer, thus limiting the photo-catalytic activity of the film. The porosity of obtained films ranges between 20 and 40 vol. %, which seems to be an excellent compromise for the photo-catalytic activity. Implementations of the invention show that the photo-catalytic activity is similar for the different films of comparable thickness and that this activity increases with the film thickness, in other words the inner part of the films contributes to malic acid photodecomposition. This observation implies that stronger catalytic activities can be reached for thicker films.

The film thickness and porosity determination from ellipsometry measurements allows determining the specific activity of the films (activity normalized with respect to the $TiO_2$ particle amount). The specific activity of films deposited on PC is slightly weaker than that of films deposited on silica, and it decreases when the film is heat-treated at temperatures higher than 110° C. Conversely, it remains unchanged when the film is heat-treated at 110° C. or less. This result indicates that a heat treatment of the film at such a temperature can be used to improve the mechanical resistance without any loss in the photo-catalytic activity of the film. The deposition of a buffer intermediate layer is also possible to avoid contamination of the photo-catalytic layer from the substrate. Such contamination could explain why the specific activity of films deposited on polymer is weaker than that of films deposited on silica. Indeed, the polymer exposed to the UV radiation can be partially decomposed at the film-substrate interface, through a direct photo-lysis or a photo-catalysis mechanism, which can in turn pollute the film and decrease its photo-catalytic activity. Then, the specific activity of films deposited on silicon substrates by a coating process according to the invention is comparable to that measured on a sol-gel $TiO_2$ film crystallized at 500° C. This feature demonstrates that the crystallization degree obtained through solution processing is comparable to that obtained after a high temperature film treatment. To summarize, films endowed with good optical and mechanical quality and good photo-catalytic properties can be deposited on polymer substrates or any kind of thermally sensitive supports. The good degree of crystallization and small particle size achieved from acidic solutions in a wide range of experimental conditions promotes the deposition at room temperature of films with high photo-catalytic efficiency and good optical transparency. The thickness of the coating can then be increased by increasing the concentration of nano-crystallites of the deposited solution or by realizing a multi layer deposition procedure, without deterioration of the optical properties of a substrate. Such an increase of the thickness increases the photo-catalytic activity. The deposition of concentrated solutions allows lowering the duration of the deposition procedure. Besides, the mechanical resistance of the films can be improved through adjustment of the solution processing parameters or by embedding the $TiO_2$ crystallites in a transparent silica matrix, optionally followed by a heat-treatment at low temperature or any other known low temperature hardening treatment. These results open the door to new applications involving the use of self-cleaning polymer or thermally sensitive objects.

The invention claimed is:

1. A process for producing a stable solution containing anatase titanium oxide intended to be deposited on a substrate in order to obtain a transparent photo-catalytic coating, comprising the steps of:
    preparing an initial stabilized peptized solution including a titanium precursor material, an organic solvent, an acid agent,
    mixing said initial solution with water in such a manner that the molar ratio of water-to-titanium of the obtained intermediate solution is greater than 0.8, the quantity of acid agent in said initial solution being such that the pH of said intermediate solution is less then 3,
    heat treating said intermediate solution at a temperature between 80° C. and 270° C.,
    dispersing the heat-treated intermediate solution,
    exchanging water by an organic solvent with lower surface tension than water to obtain a final solution,
    dispersing said final solution.

2. The process of claim 1, wherein said initial peptized solution is notably stabilized by the presence of water in order to obtain a molar ratio of water-to-titanium smaller than 1 in said initial solution.

3. The process of claim 1, wherein said initial peptized solution is notably stabilized by aging of said initial solution at room temperature.

4. The process of any one of the claim 1, wherein the quantity of acid agents in said initial solution is such that the pH of said intermediate solution is between 1 and 2.

5. The process of any one of the claim 1, wherein heat-treating step is carried out by refluxing or by autoclaving.

6. The process of any one of the claim 1, wherein heat-treating step is carried out at a temperature lower than 140° C.

7. The process of any one of the claim 1, wherein the molar ratio of water-to-titanium of the obtained intermediate solution is greater than 30.

8. The process of any one of the claim 1, wherein at least one of said dispersion steps is carried out by ultrasonication of the solution.

9. The process of any one of the claim 1, characterized in that a re-concentration step is carried out after the exchange step in order to obtain a more concentrated final solution.

10. A solution obtained by a process according to claim 1.

11. A process for coating a substrate with a photo-catalytic and transparent layer, including the step of:

preparing a solution according to claim 10, coating the substrate at room temperature with said final solution.

12. The process for coating a substrate according to claim 11, wherein a mixing step is carried out for mixing the prepared solution with a sol-gel solution of SiO2 before the coating step.

13. The process for coating a substrate according to one of the claims 11 and 12, wherein said step of coating is repeated in order to obtain a thicker layer of photo-catalytic material and greater photo-catalytic activity.

14. Substrate provided with a photo-catalytic and transparent layer, characterized in that said substrate is obtained according to a process as claimed in claim 11.

15. Substrate as claimed in claim 14, wherein said substrate is of thermally sensitive material.

16. Substrate as claimed in one of the claims 14 and 15, wherein the substrate is of polymer material.

* * * * *